US007868484B2

(12) United States Patent
Groff et al.

(10) Patent No.: US 7,868,484 B2
(45) Date of Patent: Jan. 11, 2011

(54) WORLDWIDE ADAPTIVE MULTI-COIL AUTOMATIC TRANSFER SWITCH

(75) Inventors: Steven Mark Groff, Tucson, AZ (US); Trung Le, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 159 days.

(21) Appl. No.: 12/189,567

(22) Filed: Aug. 11, 2008

(65) Prior Publication Data

US 2010/0033275 A1 Feb. 11, 2010

(51) Int. Cl.
*H02J 1/00* (2006.01)

(52) U.S. Cl. ............................ 307/87; 307/64; 307/65; 307/66; 307/1; 361/191

(58) Field of Classification Search ....................... None
See application file for complete search history.

(56) References Cited

U.S. PATENT DOCUMENTS 2,828,846 A * 4/1958 Viguers et al. .......... 192/129 A
3,646,355 A * 2/1972 Ireland et al. ................. 307/64
3,922,559 A * 11/1975 Migeon ....................... 307/64
4,239,978 A * 12/1980 Kofink ........................ 307/16
4,780,805 A 10/1988 Chewuk et al.
4,843,301 A 6/1989 Belanger
5,001,623 A 3/1991 Magid
6,091,596 A 7/2000 Godfrey et al.
6,223,296 B1 4/2001 Lin
6,330,176 B1 12/2001 Thrap et al.
6,501,196 B1 * 12/2002 Lo ............................ 307/125
6,538,345 B1 * 3/2003 Maller ......................... 307/86
6,614,671 B2 * 9/2003 Thrap .......................... 363/67
2004/0004853 A1 1/2004 Na
2006/0072262 A1 * 4/2006 Paik et al. ..................... 361/62
2006/0214512 A1 * 9/2006 Iwata .......................... 307/44

FOREIGN PATENT DOCUMENTS

DE 20 2007 005 700 U1 9/2007
EP 1 806 758 A 7/2007
JP 60102893 6/1985

OTHER PUBLICATIONS

International Search Report dated Jan. 27, 2010, for counterpart International Application No. PCT/EP2009/060251.

* cited by examiner

*Primary Examiner*—Jared J Fureman
*Assistant Examiner*—Justen Fauth
(74) *Attorney, Agent, or Firm*—Griffiths & Seaton PLLC

(57) ABSTRACT

A multi-coil automatic transfer switch (ATS) adapted for automatically switching an appropriately rated component to render the ATS operational over a worldwide voltage range is provided. A low voltage contactor includes a low voltage coil magnetically linked with a normally open low voltage main contact. A high voltage contactor is coupled in parallel with the low voltage contactor. The high voltage contactor includes a high voltage coil magnetically linked with a normally open high voltage main contact. A normally closed high voltage auxiliary contact is magnetically linked with the high voltage coil. The normally closed high voltage auxiliary contact has a phase opposite the normally open high voltage main contact. The high voltage contactor opens the normally closed high voltage auxiliary contact to disconnect the low voltage coil.

16 Claims, 2 Drawing Sheets

WORLDWIDE ADAPTIVE MULTI-COIL AUTOMATIC TRANSFER SWITCH

BACKGROUND OF THE INVENTION

1. Field of the Invention

The present invention relates in general to power distribution for electronic devices, and more particularly, but not exclusively, to automatic transfer switches for use in computing environments.

2. Description of the Related Art

An automatic transfer switch (ATS) is a circuit that automatically connects one of two alternating current (AC) line sources to an electrical load. Transfer switches may be seen where emergency power generators are used to provide back up power from the utility source. The transfer switch allows switching from utility power to emergency generator power during main line outages. An automatic transfer switch must totally isolate the two input sources.

In order to switch over from one input source to another, an ATS must either actively monitor the conditions of the two input lines and makes a disconnect and connect decision, or be designed such that it reactively connects the correct input source based on its circuitry's relative response to the changing states of the competing input sources.

The first, active monitoring option generally uses microcontrollers for the purpose of monitoring and control. Such active monitoring ATS devices generally use microcontroller-based "smart" electronic control circuits to drive low voltage coils for the purpose of opening and closing power contacts. The active monitoring and control approach provides repeatable operation at any line voltage. Supporting the microcontroller, however, requires house keeping power supplies, voltage sensors, signal condition circuitries, and control firmware. These additional requirements add to the system cost and complexity. The added complexity, in turn, degrades reliability.

The second, reflexive option is often a simple design based on interlocking mechanical contactors that open or close based on the voltage applied to their driving coils. This second option is much simpler and less expensive to implement but suffers from a major weakness as described below.

Different regions in the world have different power characteristics, more specifically the AC input voltages vary from country to country. As in most electrical designs, the ATS devices should not be region-specific; otherwise separate part numbers must be specified on a per-region, or worse, on a per-country basis. In the case of the reflexive design, even though a number of contactors of differing part numbers can be used to cover the worldwide power requirements, these part numbers do not correspond to line cord options for larger areas, such as Europe and/or the United States. In other words, there is not a single part number for a contactor that can fully cover Europe as is the case with line cord options.

SUMMARY OF THE INVENTION

In light of the foregoing, a need exists for a simple reflexive mechanical Automatic Transfer Switch (ATS) design that is implementable across multiple world regions using a same part number. Such a design would reduce system cost, complexity, and points of failure.

Accordingly, in one embodiment, by way of example only, a multi-coil automatic transfer switch (ATS) adapted for automatically switching an appropriately rated component to render the ATS operational over a worldwide voltage range is provided. A low voltage contactor includes a low voltage coil magnetically linked with a normally open low voltage main contact. A high voltage contactor is coupled in parallel with the low voltage contactor. The high voltage contactor includes a high voltage coil magnetically linked with a normally open high voltage main contact. A normally closed high voltage auxiliary contact is magnetically linked with the high voltage coil. The normally closed high voltage auxiliary contact has a phase opposite the normally open high voltage main contact. The high voltage contactor opens the normally closed high voltage auxiliary contact to disconnect the low voltage coil.

In an additional embodiment, again by way of example only, a worldwide adaptive multi-coil automatic transfer switch (ATS) is provided. An input is coupled to a low voltage main contact. A high voltage main contact is coupled in parallel with the low voltage main contact. A low voltage coil is coupled in series with the high voltage auxiliary contact. The low voltage coil is mechanically linked to the low voltage main contact. A high voltage main contact is coupled in parallel with the high voltage auxiliary contact. A high voltage coil is mechanically linked to both the high voltage auxiliary contact and the high voltage main contact. The high voltage main contact and the high voltage auxiliary contact are configured in opposite phase. The high voltage relay opens the high voltage auxiliary contact to disconnect the low voltage coil when the high voltage coil is energized.

In still another embodiment, again by way of example only, a method of manufacturing a multi-coil automatic transfer switch (ATS) adapted for automatically switching an appropriately rated component to render the ATS operational over a worldwide voltage range is provided. The method includes providing a low voltage contactor including a low voltage coil magnetically linked with a normally open low voltage main contact, providing a high voltage contactor coupled in parallel with the low voltage contactor, the high voltage contactor including a high voltage coil magnetically linked with a normally open high voltage main contact, and providing a normally closed high voltage auxiliary contact magnetically linked with the high voltage coil, the normally closed high voltage auxiliary contact having a phase opposite the normally open high voltage main contact, wherein the high voltage contactor opens the normally closed high voltage auxiliary contact to disconnect the low voltage coil.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below implement a simple, single-design automatic transfer switch (ATS) using relay coils. The illustrated embodiments automatically adapt to worldwide voltage operations without the need for components such as a smart controller, built-in AC/DC power supplies, and control code. For a particular embodiment, a single part number representative of the ATS may be utilized to cover worldwide operation. Such an implementation simplifies manufacturing and field service. In addition, the ATS provides more reliable operation as potential failure points are eliminated.

As seen in the illustrated embodiments below, the contacts of two relays or contactors are connected in parallel. One relay uses a coil rated at a higher voltage, and the other relay uses a coil rated at a lower voltage. The coils have overlapping operating tolerances that will cover the lowest to the highest worldwide power grid voltage range. For example, the tolerances of both coils may be adapted to be plus ten percent (+10%) and minus fifteen percent (−15%) of rating. To prevent the lower voltage coil rating from being exceeded, a high voltage relay may be adapted to, when connected, disconnect the low voltage relay via an auxiliary contact.

Figure 1:
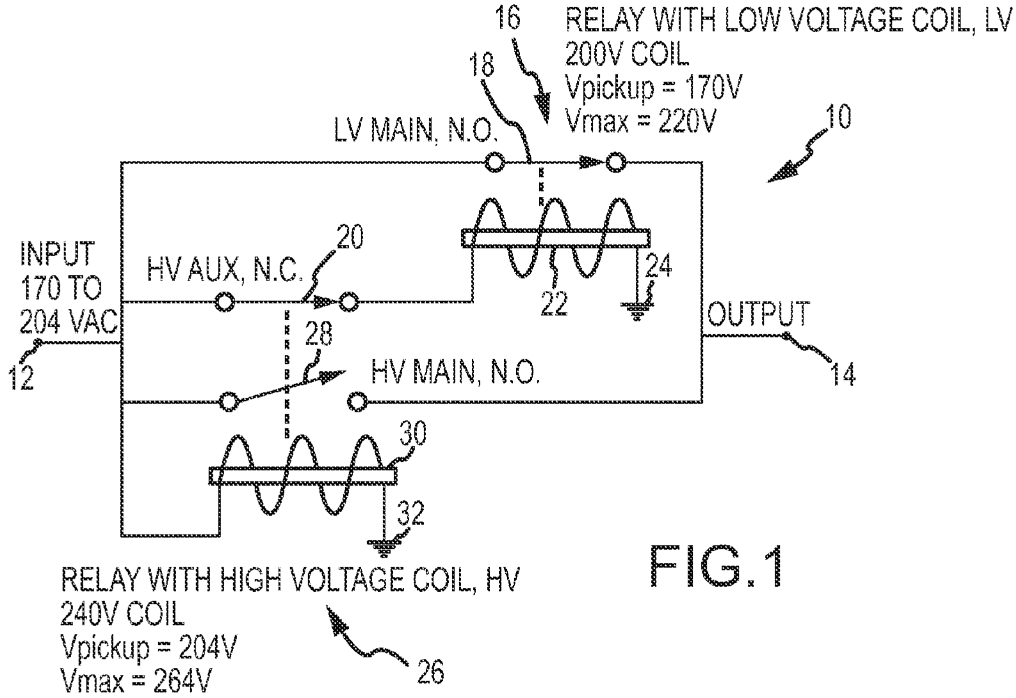
FIG. 1 is a schematic diagram of an exemplary worldwide multi-coil automatic transfer switch (ATS) in a low voltage mode of operation.

Turning to FIG. 1, an exemplary ATS 10 is shown in a low voltage mode of operation. ATS 10 includes an input 12 (in this case rated from 170 to 204 VAC), and an output 14 adapted for connection to an electrical load. A low voltage relay (contactor) 16 includes a low voltage main contact 18 configured to be normally open (N.O.). A low voltage coil 22 is magnetically linked to low voltage contact 18, as indicated by the dotted lines. When coil 22 is energized, magnetic flux from coil 22 causes contact 18 to close. Coil 22 is coupled to ground 24. In the instant embodiment, coil 22 is rated at about 200V, with a pickup voltage (Vpickup) of about 170V, and a maximum voltage (Vmax) of about 220V. Pickup voltage refers to the voltage in which the coil 22 is energized sufficiently to cause the contact 18 to close. Maximum voltage refers to the maximum voltage tolerated by the relay 16.

ATS 10 also includes a high voltage relay 26, having a high voltage coil 30 coupled to ground 32, and magnetically linked to high voltage main contact 28. In the instant embodiment, the high voltage coil 30 is rated at 240V, with a pickup voltage (Vpickup) of 204V and a maximum voltage (Vmax) of 264V. High voltage main contact 28 is also configured to be normally open (N.O.). High voltage relay 26 is coupled in parallel with low voltage relay 16 as shown, as high voltage contact 28 is coupled in parallel with low voltage contact 16.

A high voltage auxiliary contact 20 is coupled between the input 12 and the low voltage coil 22. A high voltage auxiliary contact 20 is linked to main contact 28. In this case, however, the high voltage auxiliary contact is configured in opposite phase to the high voltage contact 28. As a result, the high voltage auxiliary contact is configured to be normally closed (N.C.). When the high voltage coil 30 is energized, the magnetic flux from the high voltage coil 30 causes the high voltage contact 28 to close, and causes the high voltage auxiliary contact 20 to open, disconnecting the power path to the low voltage coil 22. As a result, the low voltage coil 22 is de-energized, and the low voltage contact 16 opens.

FIG. 1 depicts the ATS 10 in a low voltage mode of operation. With an input voltage between 170V and 204V, the output 14 is energized via the low voltage main contact 18 as shown.

Figure 2:
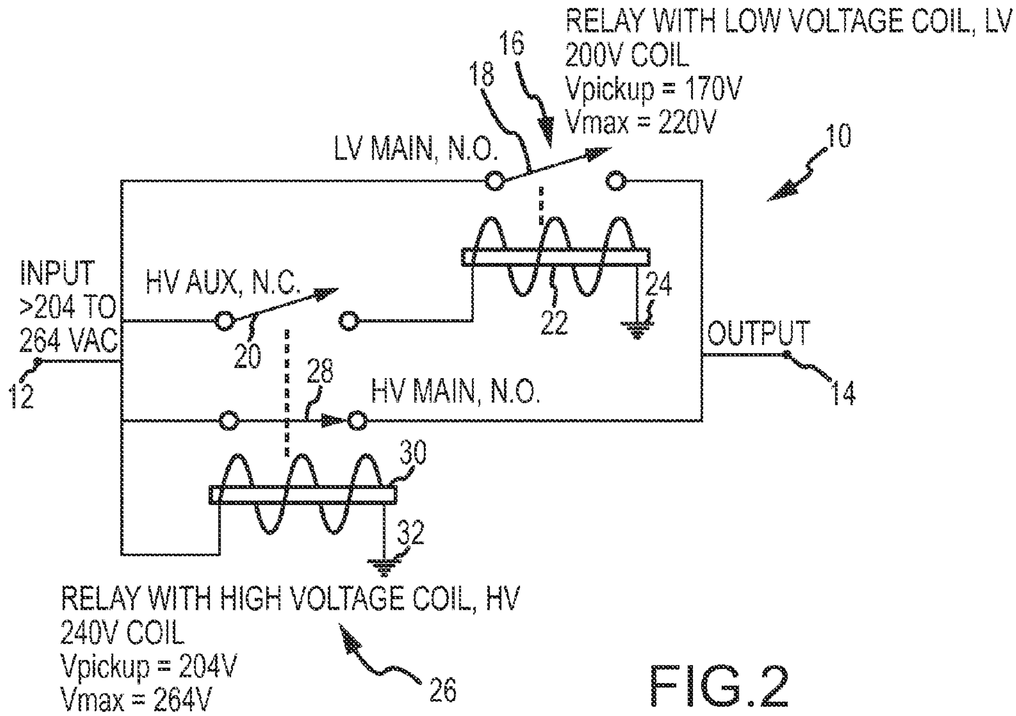
FIG. 2 is a schematic diagram of the ATS of FIG. 1, shown in a high voltage mode of operation.

Turning to FIG. 2, ATS 10 is shown in a high voltage mode of operation. If the line voltage is high enough for the high voltage coil 30 to pick up (e.g., greater than 204V in the instant embodiment), the low voltage coil 22 is de-energized via the high voltage auxiliary contact opening (high voltage auxiliary contact 20 is shown in the open position). The low voltage coil 22 is disconnected from power to prevent relay 16 voltage ratings from being exceeded at voltages over 220V (the maximum voltage). The output is energized via the high voltage main contact 28 as shown.

The functionality of ATS 10 may be considered in light of the following. The low voltage relay may be selected to have an operating voltage rating range defined as Va-Vb and a pickup voltage defined as VpLV. The high voltage relay may be selected to have an operating voltage rating Vc-Vd, and a high voltage pickup voltage VpHV. In view of these definitions, the operation of the ATS may be characterized by Vc>Va, Vc≦Vb, Vd>Vb, and VpHV>VpLV.

Figure 3:
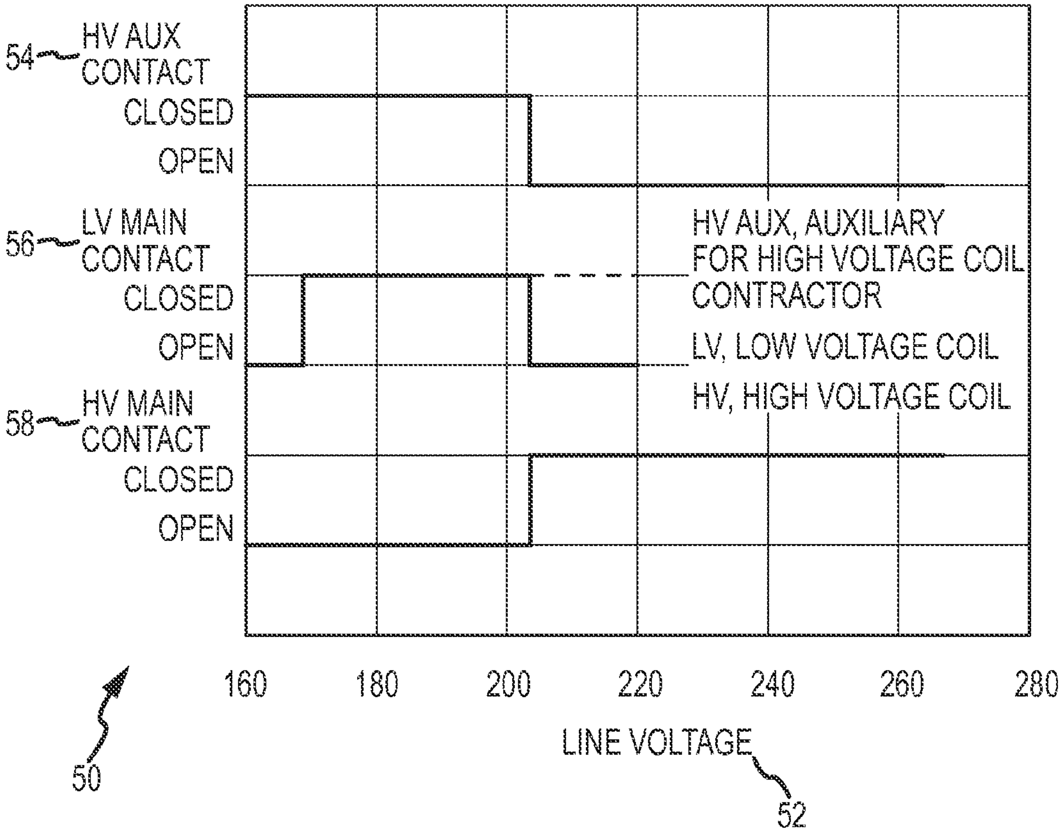
FIG. 3 is graph of exemplary line voltages of the ATS of FIG. 1.

Turning to FIG. 3, a graph 50 of line voltages (52) for each of the high voltage auxiliary contact (HV AUX) (54), the low voltage main contact (LV Main) (56), and high voltage main contact (HV Main) (58) is shown. HV AUX 54 remains closed from about 0V to about 204V, or the pickup voltage of the high voltage coil. Once the high voltage coil is energized, the HV AUX 54 stays open from the high voltage coil pickup voltage to voltages greater than 260V.

LV Main 56 is open from 0V to the pickup voltage for the low voltage coil (about 170V). From about 170 volts to about 204V, the LV Main 56 is closed, although a gray area of several volts (represented by the dotted line) may exist where the pickup voltage for the high voltage coil is exceeded and the LV Main 56 has not yet opened. From voltages of about 204V to voltages greater than 260V, the LV Main is opened.

HV Main 58 is open from about 0V to the pickup voltage of the high voltage coil (about 204V). From this pickup voltage to voltages above 260V, the HV Main 58 is closed.

As one skilled in the art will anticipate, the ATS 10 may be configured with coils of equal tolerances, but with ratings varying from the exemplary embodiments described above for a particular situation. In each case, the ATS 10 provides automatic transfer functionality across international variations in power grid voltages using a simple, cost-effective, and robust design.

While one or more embodiments of the present invention have been illustrated in detail, the skilled artisan will appreciate that modifications and adaptations to those embodiments may be made without departing from the scope of the present invention as set forth in the following claims.

What is claimed is:

1. A multi-coil automatic transfer switch (ATS) adapted for automatically switching an appropriately rated component to render the ATS operational over a predetermined voltage range, the ATS comprising:

an input configured to be coupled to a power source including a voltage within the predetermined voltage range;

an output;

a low voltage contactor including:

a normally open low voltage main contact coupled to the input and the output, and a low voltage coil coupled to ground and magnetically linked with the normally open low voltage main contact;

a high voltage contactor coupled in parallel with the low voltage contactor, the high voltage contactor including:

a normally open high voltage main contact coupled to the input and the output, and a high voltage coil coupled to ground and magnetically linked with the normally open high voltage main contact; and a normally closed high voltage auxiliary contact coupled to the input and coupled in series with the low voltage coil, the normally closed high voltage auxiliary contact magnetically linked with the high voltage coil and including a phase opposite the normally open high voltage main contact, wherein:

when the input is coupled to a high voltage power source, based on the predetermined voltage range, the high voltage contactor is configured to open, via the high voltage coil, the normally closed high voltage auxiliary contact to disconnect the low voltage coil from the input such that the ATS operates in a high voltage mode, and when the input is coupled to a low voltage power source, based on the predetermined voltage range, the low voltage contactor is configured to close, via the low voltage coil, the normally open low voltage main contact such that the ATS operates in a low voltage mode.

2. The ATS of claim 1, wherein the low voltage coil and the high voltage coil are selected to have overlapping operating tolerances from a lowest to a highest predetermined power grid voltage range.

3. The ATS of claim 1, further including an input coupled to the low and high voltage contactors, wherein the input is adapted to accept two overlapping voltage ranges.

4. The ATS of claim 1, wherein:

the low voltage contactor has an operating voltage rating range Va-Vb and a pickup voltage VpLV, the high voltage contactor has an operating voltage rating Vc-Vd, and a high voltage pickup voltage VpHV, and Vc>Va, Vc≦Vb, Vd>Vb, and VpHV>VpLV.

5. The ATS of claim 1, further including an output coupled to the low voltage contactor and the high voltage contactor, the output adapted for connection to an electrical load.

6. A worldwide multi-coil automatic transfer switch (ATS), comprising:

an input configured to be coupled to a power source including a voltage within a predetermined voltage range;

an output;

a low voltage main contact coupled to the input and the output;

a high voltage main contact coupled to the input and the output and coupled in parallel with the low voltage main contact;

a high voltage auxiliary contact coupled to the input;

a low voltage coil coupled in series with the high voltage auxiliary contact and coupled to ground, the low voltage coil magnetically linked to the low voltage main contact; and a high voltage coil coupled to the input and ground, the high voltage coil magnetically linked to both the high voltage auxiliary contact and the high voltage main contact, wherein:

the high voltage main contact and the high voltage auxiliary contact are configured in opposite phase, the high voltage coil is configured to open the high voltage auxiliary contact to disconnect the low voltage coil and close the high voltage main contact when the input is coupled to a high voltage power source, based on the predetermined voltage range, such that the ATS operates in a high voltage mode, and the low voltage coil is configured to close the low voltage main contact when the input is coupled to a low voltage power source, based on the predetermined voltage range, such that the ATS operates in a low voltage mode.

7. The ATS of claim 6, wherein the low voltage main contact is a normally open low voltage contact, the high voltage auxiliary contact is a normally closed high voltage contact, and the high voltage main contact is a normally open high voltage contact.

8. The ATS of claim 7, wherein the low voltage coil and the high voltage coil are selected to have overlapping operating tolerances covering a lowest to a highest predetermined power grid voltage range.

9. The ATS of claim 7, wherein the input is adapted to accept two overlapping voltage ranges.

10. The ATS of claim 7, wherein:

the low voltage main contact has an operating voltage rating range Va-Vb and a pickup voltage VpLV, the high voltage main contact has an operating voltage rating Vc-Vd, and a pickup voltage VpHV, and Vc>Va, Vc≦Vb, Vd>Vb, and VpHV>VpLV.

11. The ATS of claim 7, further including an output coupled to the low voltage main contact and the high voltage main contact, the output adapted for connection to an electrical load.

12. A method of manufacturing a multi-coil automatic transfer switch (ATS) adapted for automatically switching an appropriately rated component to render the ATS operational over a predetermined voltage range, the method comprising:

providing an input configured to be coupled to a power source including a voltage within the predetermined voltage range;

providing an output;

coupling a low voltage contactor to the input and the output, the low voltage contact including a normally open low voltage main contact coupled to the input and the output and further including a low voltage coil magnetically linked with the normally open low voltage main contact;

coupling a high voltage contactor to the input and the output, the high voltage contactor coupled in parallel with the low voltage contactor and including a normally open high voltage main contact to the input and the output and further including a high voltage coil magnetically linked with the normally open high voltage main contact; and coupling a normally closed high voltage auxiliary contact to the input and in series with the low voltage coil, the normally closed high voltage auxiliary contact coupled to ground and magnetically linked with the high voltage coil, the normally closed high voltage auxiliary contact including a phase opposite the normally open high voltage main contact, wherein:

the high voltage coil is configured to open the normally closed high voltage auxiliary contact to disconnect the low voltage coil from the input and configured to close the normally open high voltage main contact when the input is coupled to a high voltage power source, based on the predetermined voltage range, such that the ATS operates in a high voltage mode, and the low voltage coil is configured to close, via the low voltage coil, the normally open low voltage main contact when the input is coupled to a low voltage power source, based on the predetermined voltage range, such that the ATS operates in a low voltage mode.

13. The method of manufacture of claim 12, wherein the low voltage coil and the high voltage coil are selected to have overlapping operating tolerances from a lowest to a highest predetermined power grid voltage range.

14. The method of manufacture of claim 12, further including providing an input coupled to the low and high voltage contactors, wherein the input is adapted to accept two overlapping voltage ranges.

15. The method of manufacture of claim 12, wherein:

the low voltage contactor has an operating voltage rating range Va-Vb and a pickup voltage VpLV, the high voltage contactor has an operating voltage rating Vc-Vd, and a high voltage pickup voltage VpHV, and Vc>Va, Vc≦Vb, Vd>Vb, and VpHV>VpLV.

16. The method of manufacture of claim 12, further including providing an output coupled to the low voltage contactor and the high voltage contactor, the output adapted for connection to an electrical load.

* * * * *